Figure 1:
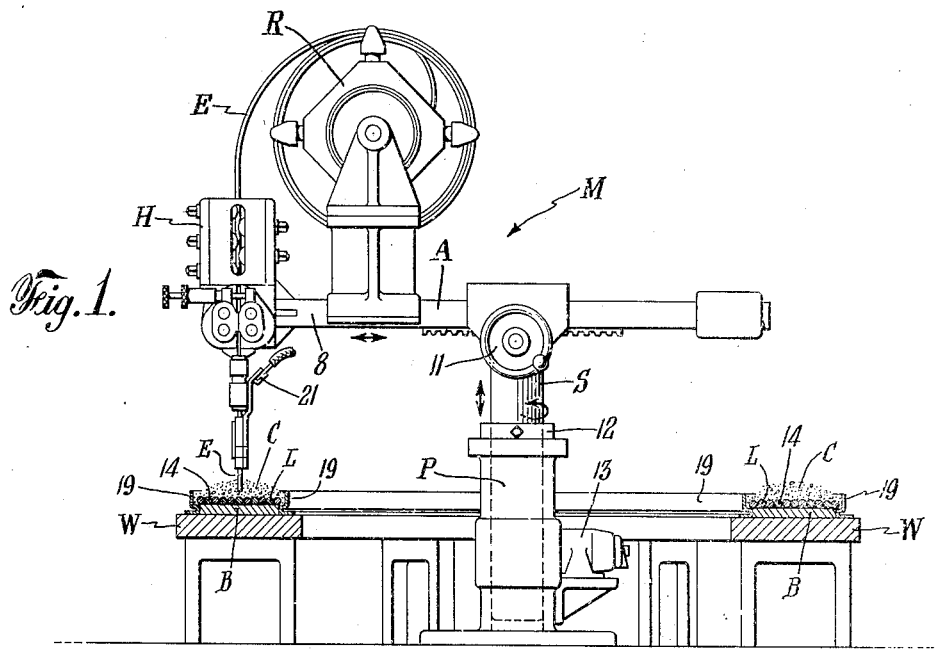

Sept. 28, 1943.   J. M. KEIR   2,330,289
METHOD OF BUILDING UP SURFACES
Filed Oct. 18, 1941

INVENTOR
JAMES M. KEIR
BY
ATTORNEY

Patented Sept. 28, 1943

2,330,289

UNITED STATES PATENT OFFICE 2,330,289

METHOD OF BUILDING UP SURFACES

James M. Keir, Bronxville, N. Y., assignor to The Linde Air Products Company, a corporation of Ohio Application October 18, 1941, Serial No. 415,593

10 Claims. (Cl. 219—10)

This invention relates to a method of depositing metal and more particularly to a method of building up the surfaces of a workpiece by the addition thereto of molten metal.

The invention is especially applicable to those metal-depositing operations in which the heat is distributed so as to melt substantially greater quantities of the base metal than filler metal. As an example of such depositing operations may be mentioned the process wherein heavy electrical current is passed to the work from a metallic electrode, usually a bare rod, inserted through deep layers of non-gassing mineral material which blankets the fusion zone and smothers the discharge path so that no open arc is visible. A process of this type is described in Patent No. 2,043,960, dated June 9, 1936.

The melting of relatively large quantities of base metal such as occurs in such an operation is particularly advantageous in butt-welding wherein two scarfed edges of metal are placed in adjoining relation to be fused together. The relatively great depth of penetration and the relatively large puddle of molten metal at the fusion zone, particularly when blanketed by a deep layer of welding composition, enable relatively heavy plates to be joined together rapidly during a single pass of the welding head, with complete penetration through the entire thickness of the metal, and the high fluidity of the molten portions of metal and flux results in a clean, sound, strong weld.

Such a great depth of penetration, though desirable in butt-welding operations, is extremely undesirable in surface-building operations, e. g., when applying a cladding layer to a workpiece during surface rebuilding and hard-surfacing operations. In such building-up operations, the added metal need penetrate into the base metal only sufficiently to obtain a complete bond, and excessive penetration is undesirable because it is wasteful of heat, and because it produces undesirable alloying of the deposited metal with the base metal. The latter is especially objectionable in connection with hard surfacing, and the like, wherein the added metal purposely is selected of a composition substantially different from the base metal, and it is desirable to prevent admixture of the two metals. If large quantities of the base metal are melted, the deposited metal becomes diluted by alloying itself therewith, and the consequent radical change in its composition detracts from the efficacy of the surfacing operation.

Some correction of the foregoing difficulties can be made by reducing the current flow through the electrode, or by raising the voltage in the welding zone, with increased spacing of the electrode from the base metal so as to produce less fusion of the base metal, but this is not satisfactory because it reduces the rate at which the metal can be deposited and thereby results in a shallower-deposited layer. The current employed is approximately proportional to the amount of metal added, so that for a specified rate of depositing metal, current within definite limits must be provided. The present invention is concerned with a method whereby the foregoing process and similar procedures may be adapted to apply substantial quantities of metal to the surface of a body during a single pass, while saving electric energy and while avoiding excessive penetration of the molten metal within the body.

The principal objects of the present invention are: to provide an improved and economical method of building up surfaces by depositing relatively thick layers of metal during a single pass; to minimize excessive penetration of the deposited metal within the base metal when such metal is added under the heating conditions encountered when heavy current is passed from a metallic electrode through a non-gassing mineral material deeply blanketing the fusion zone on the base metal, and to coordinate the current from such an electrode with the rate of addition of metal so as to most economically utilize the electrical energy available; and to provide a method adapted to produce convenient alloying of two or more constituents of the deposited metal while minimizing excessive alloying of the deposited metal with the base metal. These and other objects of the present invention will become readily apparent from the following specification and from the appended drawing disclosing apparatus for carrying out the improved method.

Figure 3:
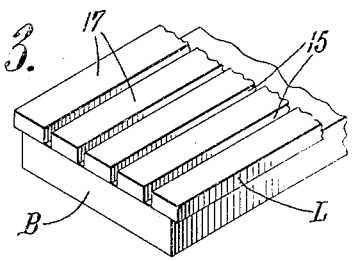
Figure 2:
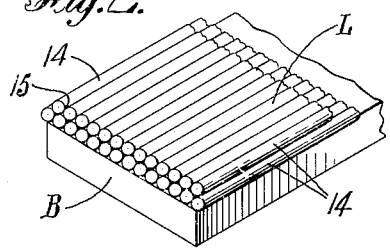
Figure 4:
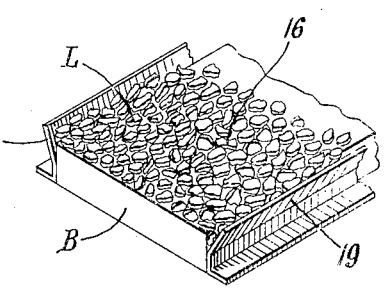
Figure 5:
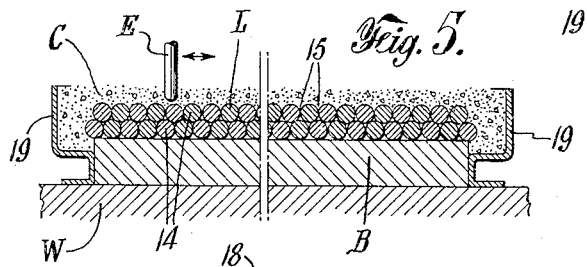
Figure 6:
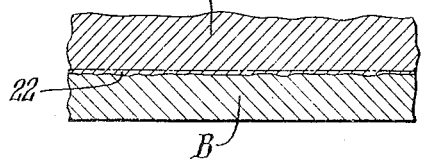

In the drawing,

Fig. 1 is a side elevational view, with portions in section, of one form of apparatus adapted to perform the present method;

Figs. 2, 3, and 4, are isometric views of a workpiece equipped with a heat absorbent layer in accordance with the principles of the present invention;

Fig. 5 is a cross-sectional view through a workpiece showing the electrode in operating position; and, Fig. 6 is a cross-sectional view through a finished workpiece illustrating the degree of penetration of the deposited layer.

As previously pointed out, in certain methods of applying a cladding layer to base metal, relatively large portions of the base metal are melted, and undesirable alloying of the cladding metal and the base metal may occur. When passing heavy electrical current from a metallic electrode to a workpiece, under a non-gassing mineral material deeply blanketing the fusion zone on the base metal, the addition of relatively small quantities of metal from the bare electrode results in the fusion of relatively great amounts of the base metal, which is undesirable when building up surfaces not only because it is inefficient, but also because it limits the amount of metal which may be added during each pass, and because it dilutes the deposited metal. The present invention adapts such processes to efficient metal-cladding operations, despite the presence on the base metal of relatively large quantities of molten welding composition at a temperature sufficient to melt the base metal to a substantial depth. Generally speaking, the present invention utilizes a heat-absorbent layer of metal L applied against the base metal B along the path of metal application. This layer is blanketed with the usual granular mineral-like, non-gassing, welding composition of the general type described in Patents 2,043,960, 2,150,625, 2,200,737, or 2,228,639, a portion of which composition is fused and maintained in a molten state by the passage of heavy current from the electrode E. As the end of the electrode is fed into the fused blanket, the normal heat developed by the current during its passage through the relatively high resistance welding composition is sufficient to fuse a considerable amount of metal forming the layer L, and a thin bonding layer of metal on the base metal B into a unitary deposit. The layer L ordinarily has the same composition as the electrode E, but it may have a composition adapted to alloy itself with the electrode E to form a surface layer having desired different properties. For each pound of rod metal deposited approximately one and one-half to two pounds of layer L and base metal are melted.

As shown in Fig. 1 a machine M of the general type disclosed in Patent No. 2,189,399, issued on February 6, 1940, may be employed. The machine M comprises a welding head H through which the electrode E is fed from a reel R. Both the head and the reel are supported on a generally horizontal counterweighted arm A adapted for lateral adjustment relative to a vertically adjustable post or standard S pivotally mounted within a pedestal P. The workpiece or base metal B comprises a flat metal plate supported upon a work table W, shown surrounding the pedestal P. The machine M may be of any conventional design adapted to position the head H adjustably with respect to a work surface, and to provide relative movement between the work surface and the end of the electrode E at a predetermined rate of speed.

In the form of the machine shown in the illustrative embodiment of Fig. 1, the position of the head H is adjusted in any conventional manner as by manipulating a handwheel 11 to alter the effective radius of the arm A, and by adjusting collar 12 to control the vertical position of the head relative to the work surface. The head H may be revolved slowly about the axis of the standard S by means of a motor 13 to propel the electrode along a circular path. The machine M, while disclosed as an apparatus capable of producing motion in a circular path, may otherwise comprise a self-propelled portable carriage, of the type disclosed in Patent No. 2,183,605, issued December 19, 1939, which carriage may be used to propel the head H and the reel R along straight or irregular paths.

The base metal or workpiece B is shown in Fig. 1 as a circular ring of the type used as a track member for supporting revolvable machines and the like. It is customary to form such track members of relatively soft steel and to deposit a hard cladding layer 18 of substantial area thereon to provide a better wearing surface. Heretofore, it has been customary to deposit all of such metal progressively from the electrode E on successive zones of the metal along the path of travel. However, this operation generated large amounts of heat necessary to fuse the granular melt, and this heat caused undesirable fusion of the base metal. To overcome excessive melting of the base metal and consequent undesirable admixture of the deposited metal with the base metal while both are in a molten state, use is herein made of an intermediate heat-absorbent layer L of metal, located between the workpiece and the end of the electrode E. The thickness of the layer is coordinated with the amount of additional metal required to be deposited from the rod to provide the desired building up, and accordingly is coordinated with the amount of current required to be passed through the electrode and fused melt to provide heat for the entire process. The heat required to fuse the granular melt and relatively smaller quantities of rod metal is sufficient to melt a heat-absorbent layer of substantial thickness, thereby providing thorough but not excessive fusion between the workpiece and the relatively thick layer of deposited metal 18 during a single pass of the electrode.

As shown in Fig. 1, the heat-absorbent layer L may comprise a single row of rods or wires 14, preferably of circular cross section laid side by side along the path of metal deposit. The width of the layer L may equal or slightly exceed the width of the work piece B as shown in Fig. 1, to obtain complete coverage over the entire surface, or fewer wires may be employed to provide a shorter width.

The nature of the layer L may vary considerably according to individual requirements. For example, if a heavy deposit is desired, the circular rods 14 or other strips may be built up of successive courses as shown in Fig. 2. Interstices 15 may be provided between the elements of the layer L to expose spaced portions of the top surface of the workpiece B to the molten metal and its protective blanket of molten welding composition, adding to the efficiency of the operation. When circular rods are used, this provision is satisfied by the natural configuration of the rods, forming longitudinal spaces between the adjoining rods of each course through which the fused blanket may seep.

Similarly, metal shot, or pellets of scrap 16 may be evenly distributed over the surface of the workpiece B as shown in Fig. 4 to form a heat-absorbent layer L of the desired thickness. The spaces naturally formed between the respective pieces 16 provide interstices to allow penetration of the molten deposit and welding composition for coaction with the surface of the workpiece B.

Bars or strips 17 of generally rectangular cross section may be laid side by side upon the surface of the body B along the path, to form the heat absorbent layer L. As shown in Fig. 3, the bars preferably are laid longitudinally of the path of travel, and it is desirable to separate them slightly to form interstices 15. Some or all the rods 14 or bars 17 may be tack-welded or otherwise secured in position to guard against shifting of the metal during passage of the head H. With the arrangement shown in Figs. 2 and 5 only an occasional wire need be tack-welded in place because of the nesting action with which the respective wires naturally locate themselves.

After the heat-absorbent layer has been formed on the workpiece B, it is covered with a blanketing layer of granular, non-gassing, mineral material or welding composition C adapted to form an electrically conductive melt when fused by the passage of current from the electrode E. Guides or retaining members 19 may be provided on opposite sides of the workpiece B as shown in Figs. 1, 4, and 5 to form a trough adapted to hold the welding composition C above and along the edges of the layer L.

Heavy current of the order of between 1,000 and 2,000 amperes per 0.25 inch of diameter of electrode is passed through the electrode E from terminal connection 21. The end of the welding electrode E, preferably a bare metal wire, is first inserted into the welding composition C. Since the composition is non-conductive when cold, a conductive path for the current is provided by bridging the gap between the electrode and the work with some conductor such as a sliver of graphite or a wad of steel wool. The power is then applied, a portion of the welding composition is locally heated by the current and becomes a conductive melt, forming a pool at a temperature well above the melting point of the adjoining metal, which pool is blanketed by a deep layer of unfused welding composition. Thereafter, the end of the electrode fuses progressively as it is fed automatically from the reel R, and the molten material flows through the interstices of the layer L, displacing the sub-surface pool of fused welding composition. At the same time, the heat which is provided during the addition of relatively small portions of the rod E is sufficient to fuse the entire layer L and a narrow zone 22 of the base metal B sufficient to provide complete penetration between the two metals, as indicated in Fig. 6.

As an example of typical operation, a 1⅛ inch layer of hard steel has been deposited during a single pass upon a metal plate one inch in thickness with an average penetration into the base metal of approximately $\frac{1}{16}$ of an inch. The heat absorbent layer constituted a double row of circular rods ⅜ inch in diameter, built up in the manner shown in Fig. 5, the balance of the deposit 18 being added from an electrode of a composition similar to the rods forming the layer L. An electrode is capable of forming a molten zone of relatively large areas, up to approximately 3 inches in width along the path of travel. Where a wider path is required, the operation may be performed with multiple electrodes in a single pass, or with a single electrode during multiple passes or oscillated laterally across the width of the path during longitudinal movement, as indicated by the double arrow in Fig. 5. It will be observed from the foregoing example that the metal added from the electrode E represents a minor portion of the total metal deposited, and yet the heat accompanying the operation is sufficient to completely fuse the heat-absorbent layer L and a narrow strip or bonding zone of the base metal B. Only small portions of the deposited metal intermingle with the base metal B so that substantially the entire deposit of filler metal retains its original composition.

It is considered likely that similar extreme heating conditions may be encountered where part or all of the welding heat is provided by a carbon or other infusible type of electrode instead of by the usual bare fusible metallic electrode, in which event the equivalent of the foregoing rod metal may be fed to the welding zone from a source separate from the electrode. Accordingly, the principles of the present invention are applicable to overcome excessive melting of base metal during a cladding operation of the type described, irrespective of what type of electrode is employed.

Modifications of the herein disclosed invention will readily suggest themselves to one skilled in the art, as the invention is susceptible of other variations without departing from the principles thereof or sacrificing its advantages.

I claim:

1. A method of building up a relatively large area of the surface of base metal with a relatively thick layer of another metal, which comprises progressively advancing a metal electrode over successive portions of said area; blanketing said portions and the adjacent end of said electrode with a granular welding composition; maintaining at least a portion of said composition in a molten and electrically conductive state at a temperature well above the melting point of said base metal and said electrode by passing from said electrode and through said composition to said base metal a current of sufficient value to melt for deposit on said surface successive portions of metal from the blanketed end of said electrode; and overcoming excessive melting of said base metal by first laying down, so as to be covered by said composition, a heat-absorbent layer of metal of a quantity sufficient to absorb substantially all of the heat that otherwise would melt said base metal, said heat-absorbent layer of metal thereby fusing beneath said composition with such melted portions of said electrode and with but a thin surface portion of said base metal.

2. A method as claimed in claim 1 wherein said heat-absorbent layer comprises separate metallic elements spread over said surface with interstices between said elements through which the molten filler metal flows downwardly into contact with the surface of the base metal.

3. A method as claimed in claim 1 wherein said heat-absorbent layer comprises rods of generally circular cross-section lying in adjoining relation with one another.

4. A method as claimed in claim 1 wherein said heat-absorbent layer is built up of a plurality of courses of adjoining rods having interstices extending between adjoining rods of each course.

5. A method as claimed in claim 1 wherein said heat-absorbent layer comprises metal having substantially the composition of said electrode.

6. A method as claimed in claim 1 wherein said heat-absorbent layer substantially covers the area of said base metal on which metal is to be deposited, and wherein said heat-absorbent layer comprises mutually adjoining pieces of metal.

7. In a blanketed electric welding building-up process wherein a substantially large area of the surface of base metal is built up with a relatively thick layer of another metal by discharging electric current through a gap beneath the surface of a blanket of granular welding composition to fuse the other metal to the base metal, limiting the depth of penetration of the other metal into said base metal by initially applying on said surface area a heat-absorbent layer of metal elements with interstices between said elements and depositing metal on said heat-absorbent layer, the weight of said heat-absorbent layer of metal elements being at least equal to that of the deposited metal.

8. A method of avoiding excessive penetration of molten filler metal within a metal workpiece when filler metal is deposited progressively on a relatively broad surface area of said workpiece from a metallic electrode conducting high-intensity current to the workpiece beneath a blanket of granular welding composition at least a portion of which is maintained in a molten state on said workpiece at a temperature well above the melting point of said workpiece and said filler metal by the passage of current from said electrode of sufficient value normally to melt substantial portions of said workpiece, said method comprising initially laying down a heat-absorbent layer of filler metal on said workpiece under said blanket of welding composition in sufficient quantity to absorb enough of said heat to prevent such melting of substantial portions of said workpiece.

9. A method of building up relatively large areas of a broad surface of a flat workpiece by fusing filler metal therewith, comprising progressively advancing an electrode of filler metal over the successive portions of said broad surface; blanketing said surface and the adjacent end of said electrode with a granular, fusible, high-resistance, non-gassing, mineral welding composition; maintaining at least a portion of said composition in a molten and electrically conductive state at a temperature well above the melting point of said workpiece and said electrode by passing from said electrode and through said composition to said workpiece a current sufficient to melt for deposit on said surface successive portions of filler metal from the blanketed end of said electrode; and overcoming excessive melting of said workpiece caused by the passage of said current and the heat of said adjoining molten composition by first laying down on said surface so as to be covered by said composition a heat-absorbent layer of filler metal of a quantity sufficient to utilize substantially all of the heat from said molten composition that otherwise would melt said workpiece, said layer thereby fusing beneath said composition with such melted portions of said electrode and with but a thin surface portion of said workpiece entirely over said areas.

10. A method as claimed in claim 9 wherein said heat-absorbent layer comprises separate metallic elements spread over said surface with interstices between said elements to encourage the flow of molten filler metal from the top of said layer downwardly into contact with said surface.

JAMES M. KEIR.